United States Patent
Smorodinsky et al.

(10) Patent No.: US 6,453,255 B1
(45) Date of Patent: Sep. 17, 2002

(54) METHOD FOR COMPLEX PRODUCTS CONFIGURATION AND GUARANTEE GENERATION

(75) Inventors: Lev Smorodinsky, Laguna Hills, CA (US); Leonard Eugene Eismann, Rancho Santa Margarita, CA (US)

(73) Assignee: Unisys Corporation, Blue Bell, PA (US)

(*) Notice: Subject to any disclaimer, the term of this patent is extended or adjusted under 35 U.S.C. 154(b) by 103 days.

(21) Appl. No.: 09/765,180

(22) Filed: Jan. 17, 2001

(51) Int. Cl.[7] .............................................. G06F 101/14
(52) U.S. Cl. .................... 702/81; 702/181; 702/182; 700/49; 700/51; 705/28; 705/29
(58) Field of Search ............................ 702/81, 119, 181, 702/182, 183, 179; 700/51, 52, 49; 705/29, 28; 709/220, 226

(56) References Cited

U.S. PATENT DOCUMENTS

| | | | | |
|---|---|---|---|---|
| 5,307,261 A | * | 4/1994 | Maki et al. | 700/107 |
| 5,963,953 A | * | 10/1999 | Cram et al. | 707/100 |
| 6,334,196 B1 | * | 12/2001 | Smorodinsky et al. | 709/108 |
| 6,370,437 B1 | * | 4/2002 | Carter et al. | 700/51 |

* cited by examiner

Primary Examiner—Bryan Bui
Assistant Examiner—Hien Vo
(74) Attorney, Agent, or Firm—Alfred W. Kozak; Mark T. Starr; Lise A. Rode

(57) ABSTRACT

A novel sales system of complex products whose configuration is designed based on the customer requirements provides method steps for generating guarantee offers. A value of the guarantee criterion for the complex product (such as product availability) can be evaluated only after the complex product configuration is determined. For each combination of the customer requirements, a system configuration and a corresponding value of the guarantee criterion is generated. Then, this value is used for the customer remedy calculations.

13 Claims, 4 Drawing Sheets

Fig. 3a

Server Farm Configuration and Guarantee Generation (page 1)

Market Management Section

*Single Server Parameters*

| | |
|---|---|
| Single Server type | "Server Type 1" |
| Single Server adjusted MTTF, hours | 1,200 |
| Single Server application benchmark or maximum number of concurrent users | 68 |
| Single Server List Price (SLP), $ | 35,000 |

*Guarantee Criteria and Thresholds*

| | |
|---|---|
| Guarantee Criterion 1 (GC1) | "no more than 1 server farm failure per year" |
| GC1 remedy per server (15% of SLP) | 5,250 |
| Threshold Probability for GC1, % | 2.5% |
| Guarantee Criterion 2 (GC2) | "no more than 0 server farms failures per year" |
| GC2 remedy per server (10% of SLP) | 3,500 |
| Threshold Probability for GC2, % | 3.8% |

Fig. 3b

Server Farm Configuration and Guarantee Generation (page 2)

Configuration Calculator with "What if" scenarious

| | What if Scenarios | | | |
|---|---|---|---|---|
| | 1 | 2 | 3 | 4 |
| Adjusted Concurrent Number of Users | 900 | 900 | 900 | 900 |
| System Repair Time, hours | 6 | 6 | 6 | 6 |
| Redundancy Factor, % | 25% | 20% | 15% | 10% |
| Estimated Number of Servers (Farm's Size) | 18 | 17 | 16 | 15 |
| Estimated Peak Number of Users | 1224 | 1156 | 1088 | 1020 |
| Estimated Redundant Number of Servers | 4 | 3 | 2 | 1 |
| Estimated Server Farm MTTF (hours) | 2,206,242 | 197,454 | 16,669 | 1,309 |
| Estimated Server Farm Availability (%) | 99.9997% | 99.9970% | 99.9640% | 99.5415% |
| Estimated Server Farm Downtime (hours/year) | 0.02 | 0.27 | 3.15 | 40.17 |

Guarantee calculator

| | | | | |
|---|---|---|---|---|
| Is this configuration a candidate for guarantee with GC1? | Yes | Yes | No | No |
| The vendor pays this remedy in case of more than 1 failure per year | 94500 | 89250 | 0 | 0 |
| Is this configuration a candidate for guarantee with GC2? | Yes | No | No | No |
| The vendor pays this remedy in case of more than 0 failures per year | 63000 | 0 | 0 | 0 |

METHOD FOR COMPLEX PRODUCTS CONFIGURATION AND GUARANTEE GENERATION

CROSS-REFERENCES TO RELATED APPLICATIONS

This application is related to co-pending applications U.S. Ser. No. 09/249,171, entitled "Estimator Program for Estimating the Availability of an Application Program That Runs in a Cluster of at Least Two Computers", U.S. Ser. No. 09/443,926, entitled "Method for Estimating the Availability of an Operating Server Farm", U.S. Ser. No. 09/474,706, entitled "Method for Server Farm Configuration Optimization", and U.S. Ser. No. 09/705,441, entitled "Method for Server Metafarm Configuration Optimization", which applications are incorporated herein by reference.

FIELD OF THE INVENTION

This invention relates to any particular complex product that is susceptible to many types of desired selectable configurations. A sales method and sales system are developed to establish a guarantee of functionality for each specific configuration of the complex product.

BACKGROUND OF THE INVENTION

The co-pending application U.S. Ser. No. 9/249,171 "Estimator Program for Estimating the Availability of an Application Program That Runs in a Cluster of at Least Two Computers", referenced above involves an estimator program to perform method steps for estimating the availability of an application program that runs on any server in a cluster of at least two servers. By "availability of an application program" is meant the probability that at any particular time instance, at least one of the servers in a cluster (server farm) will actually be servicing requests from external workstations able to use the application program.

In one embodiment, the so-called estimator program begins by receiving input parameters which include (i) multiple downtime periods for each computer in the cluster (server farm) that occur at respective frequencies due to various downtime sources, and (ii) an application failover time period for switching the running of the application program from any one computer to another operable computer. From these input parameters, the described estimator program estimates first and second annual stoppage times, then determines the availability of the application program on the cluster of computers which is derived from the sum of the first and second annual stoppage times.

Thus, as discussed, the estimator program of the previously-described application, U.S. Ser. No. 09/249,171, estimated a first annual stoppage time for the application program due solely to the concurrent stoppage of all of the computers, as a function of the ratio of a single computer virtual downtime period over the single computer virtual time between stops. Then subsequently, the estimator program was used to estimate a second annual stoppage time for the application program, due solely to switching the running application program from one computer to another computer as a function of the single virtual stoppage rate and the application failover time period. From this, the estimator program determined the availability of the application program on the cluster of computers by deriving the sum of the first and second annual stoppage times.

The estimator program method was based on the assumption that "application availability" was to be determined from four factors that were:

(i) single-server hardware reliability;
(ii) maintenance, support, and service strategies;
(iii) user application and environment;
(iv) failover or system reconnection mechanism and application recovery mechanism.

The prior estimation parameters that were described in the co-pending application, U.S. Ser. No. 08/550,603, did not take into consideration the total number of operating Server Farm clients and the normal single server workload of users involved with each single server. Further, this earlier application did not provide a recommendation or estimate regarding the Server Farm (or cluster) configuration or the number of servers required in the Server Farm (or cluster), which would meet the customers' performance and redundancy level requirements, nor did it establish an optimum farm configuration. Nevertheless, calculated availability or system reliability could eventually be used as a guarantee criterion for guarantee design and configuration offering. But, in the above-cited application, U.S. Ser. No. 08/550,603, the system configuration had been predefined and limited to a single server or a cluster of two servers.

Here below, is an example of a particular guarantee for the predefined system such as a single server or, a cluster of two servers described in U.S. Ser. No. 09/249,171 that was offered by one of the computer vendors (Unisys Corporation). The vendor company guarantees that a single server or two-server cluster systems will "experience no more than one unplanned system failure per year". If this commitment is not met, the company will issue particular credits for each system type: $1,000 credit for a 4-processor single server system, $2,000 credit for an 8-processor single server system, $5,000 credit for a 4-processor clustered server system, $10,000 credit for a 8-processor clustered server system.

The method of the co-pending application U.S. Ser. No. 09/443,926, entitled "Method for Estimating the Availability of an Operating Server Farm", extended the area of the original method application for Server Farms designed to serve user communities with a required particular number of customers "n". This method involving the Server Farm size and availability calculations is based on (1) the single server parameters such as (a) the meantime to failure (MTTF), (b) the meantime to repair (MTTR), and (c) the single server application performance benchmarks, and (2) individual customer preferential requirements, involving (a) the total number of Server Farm application users and (b) a desirable redundancy level.

This estimation method (of co-pending U.S. Ser. No. 09/443,926) for "availability" uses the following definition of Server Farm availability. This definition is the probability that a Server Farm provides access to applications and data for a particular minimum number of users. As soon as the Server Farm cannot serve this particular minimum number of users, it is considered failed. When some of the users have lost connections but can reconnect to other servers and continue to work, and the majority of users do not experience any interruptions in their work, the farm is not considered failed, if it can still serve this particular minimum number of users.

A widely used approach to improve a system's availability beyond the availability of a single system is by using Server Farms with redundant servers. In this case, if one of the farm's servers fails, the "unlucky" users connected to this server will lose their connections, but they will have an opportunity to reconnect to other servers in the farm and get access to their applications and data. If all of the "unlucky" users get access to their applications and data, the farm is considered "available." If at least one of the "unlucky" users fails to get access to his/her applications and data, it means that the Server Farm's redundancy was exhausted and the Server Farm is considered failed.

The parameters for MTTF and MTTR can be estimated, as indicated in the cited prior U.S. Ser. No. 09/249,171, as a single computer virtual time between failures and a single computer virtual downtime period, respectively, for a particular application and user environment.

Therefore, the availability estimation method of the prior application U.S. Ser. No. 09/443,926 allows one to estimate such parameters of the Server Farm as a server farm configuration (the total number of servers in the farm and the number of redundant servers in the farm), Server Farm availability, and Server Farm downtime, based on a set of input data. At the same time, however, this method does not provide any recommendations about "optimum" combinations of the Server Farm parameters that can be chosen at the Server Farm planning or design stage.

The method of the co-pending application U.S. Ser. No. 09/705,441, entitled "Method for Server Farm Configuration Optimization", added a new configuration feature to the original method of the prior application U.S. Ser. No. 09/443,926 by involving the Server Farm size optimization based on the input data that include single server parameters similar to the prior application U.S. Ser. No. 09/443,926 and at least two new extra parameters: (i) single server cost and (ii) the downtime cost. Additionally, this method included steps of selecting an optimization parameter, selecting an optimization criterion, and using an optimization technique procedure to find the optimum value of the optimization parameter.

The method of another co-pending application U.S. Ser. No. 09/705,441, entitled "Method for Server Metafarm Configuration Optimization", describes another example of a complex product configuration. The Metafarm is a group of identical Server Farms that uses a workload balancing mechanism that distributes requests for services or applications to the available servers. As a result of the configuration procedure, a Metafarm is divided into the "optimum number" of the Server Farms. The Metafarm availability is the probability that a Metafarm provides access to applications and data for a particular minimum number of users. The Metafarm availability value can be used as one of the optimization procedure constraints (for example, as a "goal") and, therefore, it influences configuration procedure results.

All of the cited co-pending applications provide configuration design methods for complex products based on product requirements. At the same time, however, these methods do not provide any recommendations about Server Farm or Metafarm "guarantees" similar to the guarantee described above. Estimated system parameters such as Server Farm (or Metafarm) availability or Server Farm (or Metafarm) downtime can significantly vary for different product configurations. The complexity of the configurations complicates the guarantee definition for each of the possible configurations.

The presently described new method involving the complex products configuration and guarantee generation is based on the input data that includes customer requirements. In one embodiment the data includes single server parameters similar to the prior applications (U.S. Ser. Nos. 09/249,171, 09/443,926, 09/474,706, and U.S. Ser. No. 09/705,441) and at least one complex product guarantee threshold for the guarantee criterion. This new method includes newly added steps of guarantee method design and risk/cost analysis of the complex product for the specific customer that includes (i) selecting complex product requirements, (ii) selecting a guarantee criterion, (iii) inputting data in a configuration "calculator", (iv) configuration calculation, (v) calculating the value of the guarantee criterion that depends on the complex product configuration, and (vi) generation of the guarantee recommendation for each product configuration.

While the present invention may be shown in a preferential embodiment for a Server Farm that should serve a particular number of concurrent users, it is not limited thereto, and can be used for any other complex products where (i) the product configuration is designed based on the customer requirements, (ii) the variety of configurations is not predefined, and (iii) complex product characteristics such as product availability or product downtime can be estimated and significantly vary for different product configurations. For example, a complex product could involve an automobile which can be purchased in many different configurations such as (i) engine (4 cylinder, 6 cylinder or 8 cylinder); (ii) two-door or four-door; (iii) manual or automatic transmission; (iv) two or four-wheel drive; (v) automatic four-wheel brakes or standard brakes; (vi) or a variety of other additives and features which make the final product involve a specially-chosen configuration.

Thus, in the example of a selected automobile configuration, the guarantee of proper functionality will depend on the reliability parameters involved in the various components which make-up the complex product.

This invention relates to a sales method and sales system of complex products whose configuration is designed based on customer requirements. Another example of this kind of complex product is a server farm that consists of several servers that should provide a required performance level for a particular number of concurrent users. A value of a designated guarantee criterion for the server farm such as system availability can be evaluated only after the server farm configuration is determined. Therefore, for each combination of the specific customer requirements, a system configuration and corresponding value of the guarantee criterion will be generated. Then, this value is used for the customer "remedy calculations". For example, it can be compared with predefined thresholds that correspond to particular algorithms of the remedy calculations.

Thus the object of the present invention is to provide a method of guarantee generation by designing the complex product configuration based on the customer requirements. The newly-described method will generate a guarantee recommendation for the selected set of input data and the selected guarantee criterion.

SUMMARY OF THE INVENTION

In accordance with the present invention, a novel sales system of complex products whose configuration is designed based on the customer requirements provides method steps for generating guarantee offers. A value of the guarantee criterion for the complex product (such as product availability) can be evaluated only after the complex product configuration is determined. Therefore, for each combination of the customer requirements, a system configuration and a corresponding value of the guarantee criterion will be generated. Then, this value is used for the customer remedy calculations. For example, it can be compared with predefined thresholds that correspond to particular algorithms of designated remedy calculations.

In one particular embodiment, an example of this kind of a complex product is a Server Farm that consists of several servers that should provide a required predetermined performance level. The Server Farm vendor offers a certain minimum number of the server farm failures per year as a guarantee criterion. The guarantee method shown herein provides two different guarantee thresholds: (i) zero server farm failures per year; and (ii) one server farm failure per year. The remedy is calculated as a function of the threshold and the number of servers that make up the server farm.

The present method uses the fact that for some configurable complex products, the variety of possible configurations is not predefined and complex product characteristics such as product performance, availability or product downtime can be estimated for any custom-generated product configuration. These product characteristics significantly vary for different product configurations.

BRIEF DESCRIPTION OF THE DRAWINGS

FIG. 3 shows an example of the several Server Farm configurations and corresponding guarantee offers that are calculated based on the particular customer requirements. FIG. 3 is developed on 2 sheets designated as FIGS. 3a and 3b.

GLOSSARY LIST OF RELEVANT ITEMS

Figure 1:
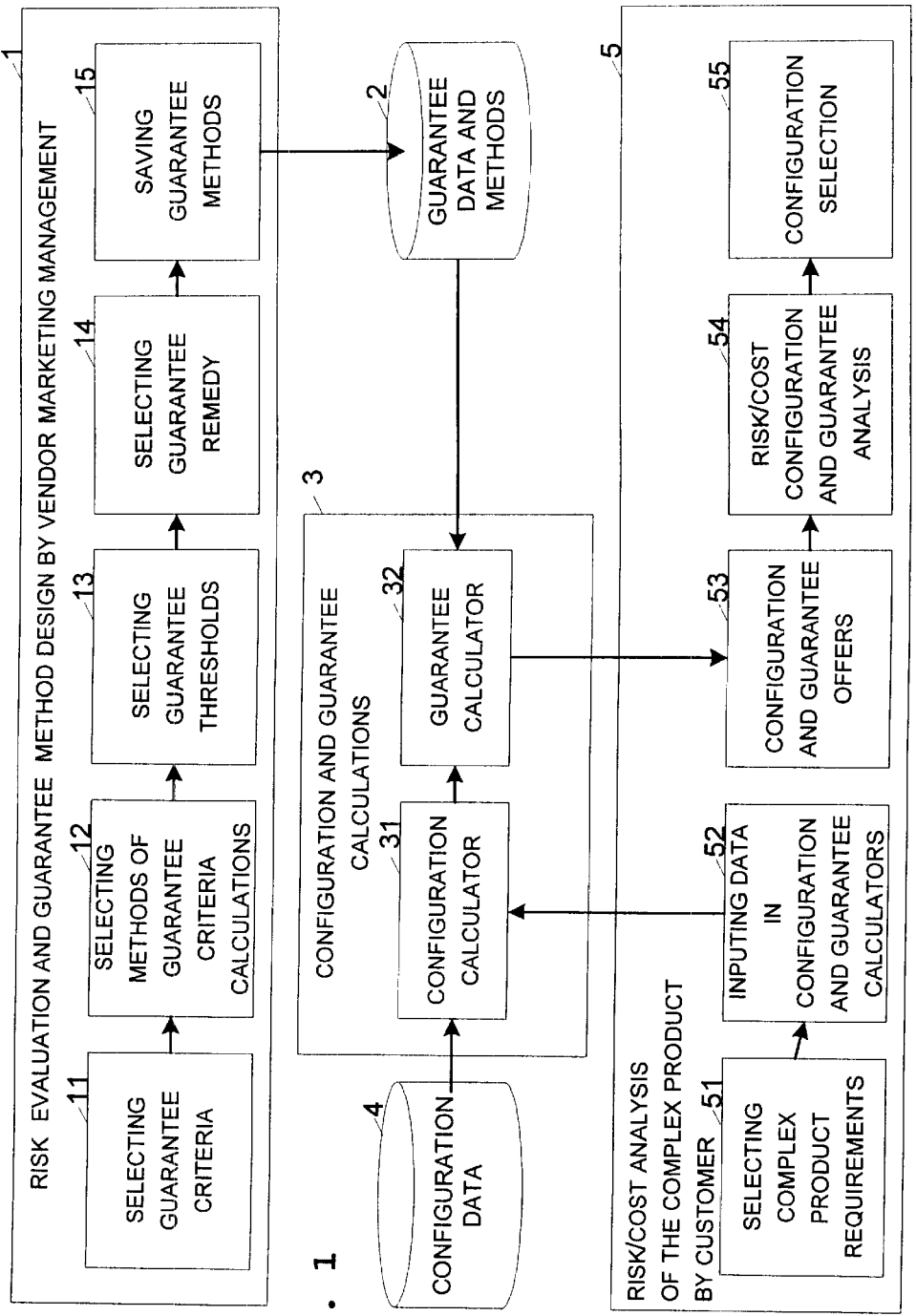
FIG. 1 is a drawing showing a Method for the Complex Products Configuration and Guarantee Generation.

1. AVAILABILITY: This is a measure of the readiness of the system and an application to deliver an expected service to the user with a required performance level. It may be described as a percentage of time that a system and an application are running as distinguished from the system being down for maintenance or repairs.
2. COMPLEX PRODUCT: This is a product that consists of many components and is susceptible to many types of desired selectable custom configurations. Estimated system parameters such as complex product availability or complex product downtime can significantly vary for different product configurations. The complexity of the configurations complicates the guarantee definition for each of the possible configurations.
3. COMPLEX PRODUCTS REQUIREMENTS: A set of custom requirements that can be utilized by CONFIGURATION and GUARANTEE CALCULATORS for defining a custom complex product configuration and for calculating guarantee offers.
4. CONFIGURATION CALCULATOR: This is a program that defines a complex product configuration based on the COMPLEX PRODUCTS REQUIREMENTS.
5. CONFIGURATION DATA: This is a database that includes all information required by the CONFIGURATION CALCULATOR for defining a complex product configuration based on the COMPLEX PRODUCTS REQUIREMENTS.
6. CONFIGURATION AND GUARANTEE OFFERS: This is a report generated by the CONFIGURATION AND GUARANTEE CALCULATORS and includes one or more complex product configuration definitions and corresponding guarantee offers.
7. CONFIGURATION SELECTION: This is an act of choosing one of the several complex product configurations that meet COMPLEX PRODUCTS REQUIREMENTS. The customer makes the selection based on RISK/COST CONFIGURATION AND GUARANTEE ANALYSIS.
8. CUSTOMER REMEDY CALCULATION: This is a method step performed by the GUARANTEE CALCULATOR where the remedy is calculated based on the complex product configuration definition passed from the CONFIGURATION CALCULATOR.
9. DOWNTIME: The downtime or repair time for a single application server is the time interval required to restore the server and system back to normal business operation. At the end of the repair period the applications running on the repaired server are available to users. The downtime for a Server Farm is the time interval required to restore the nominal Server Farm performance.
10. ESTIMATOR PROGRAM: This is a program that performs method steps for estimating system parameters such as the availability of application programs running on any computer, server cluster, or server farm. This type of estimator program was the subject of co-pending applications U.S. Ser. Nos. 09/240,171 and 09/443,926, which are incorporated herein by reference.
11. exp(x): A mathematical function that returns e raised to the power of x, where x is a number or numerical expression. For this function, x becomes the exponent applied to the base of the transcendental number e, where e equals approximately 2.71828.
12. GUARANTEE CALCULATOR: This is a program that performs guarantee method steps and generates GUARANTEE OFFERS based on the complex product configuration definitions passed from the CONFIGURATION CALCULATOR.
13. GUARANTEE CRITERION: This is a characteristic of the complex product that is a function of the complex product parameters and can be used for a guarantee agreement definition. The Guarantee Criterion defines a particular valuable quality of the product and, usually, can be estimated based on the values of these complex product parameters. The Guarantee Criterion can be measured during product operation life and compared with an expected Guarantee Criterion value of the product offered for sale often with a promise of reimbursement.
14. GUARANTEE METHOD: This is a set of rules and orderly actions (steps) that define guarantee criterion, algorithms of guarantee criterion calculations, guarantee remedy and other parameters and algorithms required for the complex product GUARANTEE OFFER generation and the guarantee agreement support.
15. GUARANTEE OFFER: a document setting out a GUARANTEE CRITERION and a promise of compensation (GUARANTEE REMEDY) made by a manufacturer of the complex product for a particular custom complex product configuration. GUARANTEE OFFERS are generated by the GUARANTEE CALCULATOR based on the COMPLEX PRODUCTS REQUIREMENTS.
16. GUARANTEE REMEDY (GUARANTEE CRITERION REMEDY): This is a compensation promised in the complex product guarantee offer. The vendor is obligated to provide the remedy if the guarantee is not fulfilled.
17. MEAN TIME TO FAILURE (MTTF): This is the average operating time between two failures, that can be estimated as the total operating time divided by the number of failures.
18. MEAN TIME TO REPAIR (MTTR): This is the average "downtime" in case of failure, that can be estimated as the total downtime divided by the number of failures.
19. OPTIMIZATION CRITERION: This is a function that determines the value of one of the essential system attributes and must be minimized (or maximized) by variation of one or more system parameters that are chosen as OPTIMIZATION PARAMETERS. Each optimization parameter should have a predefined domain that defines the values that the optimization parameter may assume. The OPTIMIZATION CRITERION is a focus of an optimum system design or configuration. Examples of the optimization criteria are system performance, system availability, and cost of ownership.

20. PRODUCT CONFIGURATION: This is a way the parts or elements of a complex product are selected, arranged and fit together to meet COMPLEX PRODUCTS REQUIREMENTS.

21. REDUNDANCY FACTOR (Rf): This is a measure of the additional number of users that can be added to the nominal number of users per server without exceeding the maximum number of users per server (server performance benchmark maximum of users). It is a difference between maximum and nominal performance as a percentage of the maximum performance. The Redundancy Factor can be calculated as 100 percent minus a usage factor Uf.

22. RISK/COST ANALYSIS (RISK/COST CONFIGURATION AND GUARANTEE ANALYSIS): This is an assessment of an investment into the complex product based on careful consideration of the probability (the statistical chance), amount, or type of possible loss and the remedy promised by the manufacturer of the complex product as a compensation for this loss.

23. SERVER FARM: This designates a group of identical individual servers wherein each server can provide service to many single individual clients. The Server Farm can run enterprise class client/server applications (SAP, PeopleSoft, Microsoft SQL) or applications that are traditionally run on a single workstation (Microsoft Office 97). The Server Farm usually uses a workload balancing mechanism that distributes requests for services or applications to the available servers.

24. SERVER FARM AVAILABILITY CALCULATOR: This is an estimator program that estimates the availability for the Server Farm.

25. SERVER METAFARM or METAFARM: This designates a group of identical Server Farms (see definition of the Server Farm below) that uses a workload balancing mechanism that distributes requests for services or applications to the available servers.

26. THIN CLIENT SERVER FARM AVAILABILITY CALCULATOR: This is one of the examples of the SERVER FARM AVAILABILITY CALCULATORS. Because thin-client configurations are intended to make applications available to multiple users at the same time, this calculator calculates the availability of a specified number of instances of an application (not just a single instance) where each application instance is being run at the server, but all the user input response is taking place at the client terminal. In this scenario, downtime occurs whenever the number of available instances of the application drops below the required specified number of instances.

27. THRESHOLD (GUARANTEE THRESHOLD): This is a level of the system parameter or characteristic, which is a function of the GUARANTEE CRITERION (in some cases this system characteristic is the GUARANTEE CRITERION itself), that is used as a point of the acceptance or rejection of a COMPLEX PRODUCT CONFIGURATION for a guarantee offer based on the comparison of this level with the value of the same system parameter or characteristic calculated for a particular configuration. If the calculated (estimated) value exceeds (or does not exceed for some of the parameters) the GUARANTEE THRESHOLD, then the guarantee based on this particular GUARANTEE CRITERION is not offered. THRESHOLD value is chosen by the vendor or manufacturer of the complex product for each GUARANTEE METHOD. Different levels of the guarantee thresholds and corresponding guarantee remedies are defined based on one of the risk analysis methods that can involve a sales plan and a comparison of the forecasted remedy payments (estimated) with a remedy payments plan.

28. THRESHOLD PROBABILITY: This is an example of the GUARANTEE THRESHOLD where the system characteristic, that is used as a point of the acceptance or rejection of a COMPLEX PRODUCT CONFIGURATION for a guarantee offer, is a probability of some COMPLEX PRODUCT event, such as "one complex product failure per year".

29. USAGE FACTOR (Uf): This is the ratio of the nominal number of users per server to the maximum number of users per server (server performance benchmark maximum of users) times 100 percent.

30. VENDOR (MANUFACTURER) MARKETING MANAGEMENT: This is a part of the vendor (manufacturer) management team that is responsible for GUARANTEE METHOD design for each COMPLEX PRODUCT.

DESCRIPTION OF PREFERRED EMBODIMENT

In accordance with the present invention, FIG. 1 illustrates a sales method of complex products whose configuration is designed based on the specific customer requirements. This method will be described in conjunction with FIG. 2 that shows a generalized diagram of the Server Farm that is an example of one complex product to which the present invention can be applied, and FIG. 3 that demonstrates an example result of the complex product configuration and guarantee generation.

Shown in FIG. 1 is the method of operations that includes three major sections: (1) "Risk Evaluation and Guarantee Method Design By Vendor Marketing Management" 1; (2) "Risk/Cost Analysis Of The Complex Product By Customer" 5; and (3) "Configuration and Guarantee Calculations" 3.

The "Risk Evaluation And Guarantee Method Design By Vendor Marketing Management" (Section 1) steps depend on the particular complex product.

Figure 2:
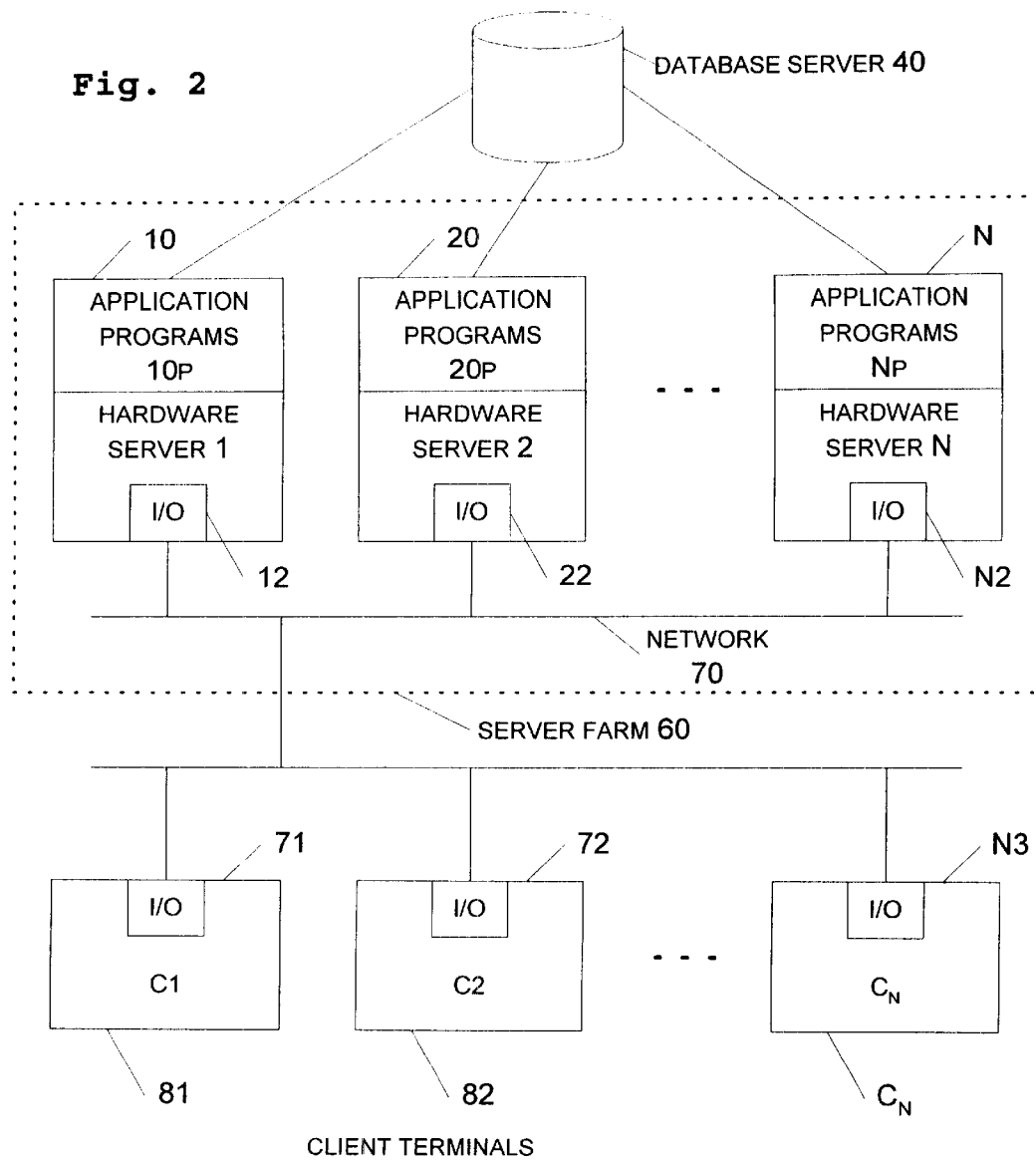
FIG. 2 is a drawing of a Server Farm that is a typical example of a complex product having a configuration that is not predefined before the start of the sales process for a particular customer.

FIG. 2 is a generalized diagram that shows an example of a complex product that was chosen for illustration of the method and to which the present invention can be applied. Shown in FIG. 2 is an application Server Farm 60, a database server 40, and a set of client terminals 81, 82, . . . ,$C_N$, having respective I/O modules 71, 72, . . . ,N3. The database server 40 is connected to a group of farm servers designated as 10, 20, . . . ,N. Each of the servers is able to run application programs designated as 10$p$, 20$p$, . . . , N$p$. Network 70 is coupled to Input/Output (I/O) units 12, 22, . . . ,N2, on the farm servers 10, 20, . . . ,N and to I/O units 71, 72, . . . ,N3 on client terminals 81,82 , . . . ,$C_N$. Users (clients) can use client terminals 81,82, . . . ,$C_N$ to access the application programs in the farm servers via the network 70.

There are several groups of parameters that impact the server farm configuration. The first group of parameters includes the type of the server farm (single server farm or Metafarm), the type of the single server that makes up the server farm, and the corresponding single server parameters such as (a) the meantime to failure (MTTF), (b) the meantime to repair (MTTR), and (c) the single server application performance benchmarks. Single server parameters for each single server type are usually predefined by the vendor and are saved in the Configuration Data database 4 of FIG. 1.

Another group of the configuration parameters can be derived from the customer required complex product parameters. Examples of these parameters are: a required minimum particular number of concurrent server farm users "n" or a required minimum server farm availability level, or both of them. Some of the configuration methods that use these or other parameters were described in the co-pending applications referenced above.

In step 11 of the "Risk Evaluation And Guarantee Method Design By Vendor Marketing Management" of section 1 of FIG. 1, several guarantee criteria are selected for each type variation of the complex product. Examples of guarantee criteria here are: server farm availability or a minimum number of said complex product failures per a specified period.

Then, in step 12, methods of guarantee criteria calculations are determined. For example, in case Server Farm availability is chosen as a guarantee criterion for a Server Farm product, the method of the availability calculations from the co-pending application U.S. Ser. No. 09/443,926, entitled "Method for Estimating the Availability of an Operating Server Farm" can be selected here.

In steps 13 and 14, different levels of the guarantee thresholds and corresponding guarantee remedies are defined based on one of the risk analysis methods that can involve a sales plan, a comparison of the forecasted remedy payments (estimated) and a remedy payments plan. For example, the vendor plan is to sell Server Farms with 1000 servers where the list price of each server is $35,000, and the total remedy should not exceed $400,000 for 3 years. The remedy amount that should attract customers to meet the sales plan is 15% of the list price for Guarantee Criterion 1 (GC1) and 10% of the list price for the Guarantee Criterion 2 (GC2). Now the marketing management should choose such threshold probabilities for each guarantee criterion that the remedy estimates for the worst case scenario will not exceed $400,000 for 3 years. If they select 4% thresholds for GC1 and GC2, then the remedy estimate can be calculated as follows:

GC1 Remedy Payment Estimate=

$$=\$35,000 \times 1,000 \times 0.15 \times 0.04 \times 3 = \$630,000$$

GC2 Remedy Payment Estimate=

$$=\$35,000 \times 1,000 \times 0.10 \times 0.04 \times 3 = \$420,000$$

Both remedy payment estimates exceed $400,000 and the marketing goal can not be met. Therefore, the marketing management should try smaller values for the threshold probabilities. If they decrease the threshold probabilities with a step value equal to 0.1% and recalculate the corresponding estimates, then at 3.8% thresholds for GC1 and GC2 the remedy estimates can be calculated as follows:

GC1 Remedy Payment Estimate=

$$=\$35,000 \times 1,000 \times 0.15 \times 0.038 \times 3 = \$598,500$$

GC2 Remedy Payment Estimate=

$$=\$35,000 \times 1,000 \times 0.10 \times 0.038 \times 3 = \$399,000$$

In this case, the GC2 Remedy Payment Estimate $399,000 is less then $400,000, therefore 3.8% threshold probability can be selected for the GC2. As to GC1 Remedy Payment Estimate, it still exceeds $400,000 and can not be accepted. Therefore they should continue the process until the GC1 Remedy Payment Estimate becomes less than $400,000. If they select 2.5% threshold for GC1, then the remedy estimate is:

GC1 Remedy Payment Estimate=

$$=\$35,000 \times 1,000 \times 0.15 \times 0.025 \times 3 = \$393,750.$$

If the marketing management prefers to select particular threshold probability values first, then they need to adjust the remedy amount per server as a percentage of the single server list price for each of the guarantee criteria.

In step 15, all guarantee data and methods designed by the vendor marketing management are saved in the "Guarantee Data and Methods" database 2, FIG. 1.

"Risk/Cost Analysis Of The Complex Product By Customer" section 5 of FIG. 1, includes steps that allow the customer to make a particular configuration selection decision for the complex product.

FIG. 3 shows an example of the generation of the Server Farm configuration and guarantee offers based on the "Configuration Data" database 4 of FIG. 1, the "Guarantee Data and Methods" database 2 of FIG. 1, and the complex product requirements selected at step 51 "Selecting Complex Product Requirements" of FIG. 1. Table I below illustrates all data groups that were used for this example.

In steps 51 and 52 of the "Risk/Cost Analysis Of The Complex Product By Customer" at section 5 of FIG. 1, the customer selects complex product requirements, 51, and input data in configuration and guarantee calculators, 52. For the example in FIG. 3, this data is presented at lines 1.1–1.7 of Table I.

TABLE I

INPUT DATA USED FOR A SERVER FARM
CONFIGURATION AND GUARANTEE GENERATION

| | | Configuration | | | |
|---|---|---|---|---|---|
| | | 1 | 2 | 3 | 4 |
| 1 | Selecting Complex Product Requirements, step 51 of FIG. 1: | | | | |
| 1.1 | Complex product type | Server farm | Server farm | Server farm | Server farm |
| 1.2 | Single server type | Type 1 | Type 1 | Type 1 | Type 1 |
| 1.3 | Required concurrent number of users | 900 | 900 | 900 | 900 |
| 1.4 | Guarantee Criterion 1 (GC1) | No more than 1 server farm failure per year | No more than 1 server farm failure per year | No more than 1 server farm failure per year | No more than 1 server farm failure per year |
| 1.5 | Guarantee Criterion 2 (GC2) | No more than 0 server farm failures per year | No more than 0 server farm failures per year | No more than 0 server farm failures per year | No more than 0 server farm failures per year |
| 1.6 | Server MTTR, hours | 6 | 6 | 6 | 6 |
| 1.7 | Redundancy Factor, % | 25 | 20 | 15 | 10 |

TABLE I-continued

INPUT DATA USED FOR A SERVER FARM CONFIGURATION AND GUARANTEE GENERATION

| | | Configuration | | | |
|---|---|---|---|---|---|
| | | 1 | 2 | 3 | 4 |
| 2 | Data from the Configuration Data database 4 of FIG. 1:: | | | | |
| 2.1 | Maximum number of concurrent users per server | 68 | 68 | 68 | 68 |
| 2.2 | Server MTTF, hours | 1,200 | 1,200 | 1,200 | 1,200 |
| 3 | Data from the Guarantee Data and Methods database 2 of FIG. 1: | | | | |
| 3.1 | Server List Price (SLP), $ | 35,000 | 35,000 | 35,000 | 35,000 |
| 3.2 | Threshold Probability for GC1, % | 2 | 2 | 2 | 2 |
| 3.3 | Threshold Probability for GC2, % | 2 | 2 | 2 | 2 |
| 3.4 | Guarantee Remedy for GC1 per server | 15% of SLP | 15% of SLP | 15% of SLP | 15% of SLP |
| 3.5 | Guarantee Remedy for GC2 per server | 10% of SLP | 10% of SLP | 10% of SLP | 10% of SLP |

SLP = Server List Price

FIG. 3 is a selected typical report example for the analysis of a Server Farm Configuration and Guarantee Generation. Here, the first section is designated as the Market Management Section, which provides two groups of parameters. The first group Single Server Parameters includes a single server type "Server Type 1", a single server adjusted Mean Time To Failure of 1,200 hours, a single server application benchmark, or maximum number of concurrent users, that is equal to 68 users, and a single server list (SLP) price of $35,000.

The second group of parameters Guarantee Criteria and Threshold includes two guarantee criteria and the corresponding remedies and threshold probabilities. The Guarantee Criterion 1 is "no more than one Server Farm failure per year" with a threshold probability for the Guarantee Criterion 1 as being 2.5%. If Guarantee Criterion 1 is not met, that is to say, more than one server farm failure occurs per year, then the vendor pays the remedy of $5,250 per each server of the farm, which is 15% of a single server list price. Then subsequently, there is shown the Guarantee Criterion 2 that is, "no more than 0 (zero) Server Farm failures per year" with the threshold probability for the Guarantee Criterion 2 as being equal to 3.8%. If Guarantee Criterion 2 is not met, that is more than zero server farms failures occur per year, then the vendor pays the remedy of $3,500 per each server of the farm, which is 10% of a single server list price.

Then, in FIG. 3, there is shown the section designated as the "Configuration Calculator with 'What If' scenarios". As seen here, there are four "What If Scenarios" that represent four different sets of the customer requirements. The first scenario (#1) shows 900 users as the adjusted concurrent number of users with a system repair time of 6 hours and a redundancy factor of 25%. Scenario #2, #3, and #4 show 900 concurrent users, 6 hours of repair time, but a redundancy factor of 20%, 15%, and 10%, respectively.

The second set of parameters shown at lines 2.1–2.2 of Table I for each scenario is predefined at the Configuration Data database 4 (FIG. 1) and is read by Configuration Calculator 31 (FIG. 1) based on the single server type "Type 1", selected by the customer at step 51 of FIG. 1. Then, the next portion of the "Configuration Calculator with '"What If' scenarios" (FIG. 3) shows several configuration and system parameters calculated as estimates by the "Configuration Calculator". The first one is the estimated number of servers in a farm, that is to say, the farm size, shown in sequence for the four scenarios as being 18 servers, 17 servers, 16 servers, and 15 servers. The next lines respectively show the estimated peak number of users as 1,224 users, 1,156, 1,088, and 1,020 users, and the redundant number of servers as being 4, 3, 2 and 1; the estimated Server Farm Mean Time To Failure in hours, the Server Farm Availability (%), and the Server Farm Downtime in hours per year.

Then further in FIG. 3, there is seen the section called the "Guarantee Calculator". There are two report lines for each of two guarantee criteria. The first line indicates possible candidates for the Guarantee Criterion with "Yes" at the corresponding column, and the second line indicates total remedy for each of the Server Farm configurations that have been marked with "Yes".

Here, for the Guarantee Criterion 1, only "What If" scenarios #1 and #2 meet the Guarantee Criterion 1 threshold probability, and the vendor can offer guarantees for scenarios #1 and #2. Here, the vendor will pay the remedy of $94,500 and $89,250, respectively, in case of more than one server farm failure per year. However, the guarantees for "What If" scenarios #3 and #4 will not be offered as indicated by the "No" in corresponding columns for this criterion.

For Guarantee Criterion 2, which involves a guarantee of zero, or no server farm failures per year, only scenario #1 configuration meets the Guarantee Criterion 2 threshold probability and is marked with "Yes". The vendor will pay the customer $63,000 in case more than zero server farm failures occur per year. There will not be any guarantee offered for the "What If" scenarios #2, #3 and #4.

Now referring to Table I below, which is designated "Input Data Used for a Server Farm Configuration and Guarantee Generation". Here, there are shown three sets of input data for the example in FIG. 3 that correspond to three different sources of input data. The first set of parameters, shown at lines 1.1–1.7 for each scenario, is defined at "Selecting of the Complex Product Requirements" step 51 of FIG. 1.

The second set of parameters shown at lines 2.1–2.2 for each scenario is predefined at the Configuration Data database 4 (FIG. 1) and is read by the Configuration Calculator 31 based on the single server type "Server Type 1" selected by the customer at step 51 of FIG. 1.

The third set of parameters shown at lines 3.1–3.5 for each scenario is predefined in the Guarantee Data and Methods database 2 (FIG. 1) and is read by Guarantee Calculator 32 based on the single server type "Type 1" and guaranteed criteria GC1 and GC2 selected by the customer at step 51 of FIG. 1.

In step 31 of "Configuration and Guarantee Calculations", Section 3 of FIG. 1, the "Configuration Calculator" 31 receives data from the step "Inputing data in Configuration and Guarantee calculators" 52 (presented at lines 1.1–1.7 of Table I) and reads additional data from the Configuration Data database 4 (presented at lines 2.1–2.2 of Table I). Then, the "Configuration Calculator" 31 provides calculations and passes the resultant configuration information to the "Guarantee Calculator" 32.

In step 32 of FIG. 1, the "Guarantee Calculator" reads additional guarantee data and methods definitions from the "Guarantee Data and Methods" database 2 (presented at lines 3.1–3.5 of Table I) and then confirms ("generates") the "guarantee offers" for some of the configurations.

For example, for scenario #2 of GC1 of FIG. 3, the "Guarantee Calculator" first determines the server farm reliability R as the probability that the server farm will not fail for a year, or 8760 hours (365 days in a year×24 hours per day) based on the Estimated Server Farm MTTF=197, 454 hours passed from the "Configuration Calculator" 31:

$R=\exp(-8760/197,454)=0.9566050.$

Then, the "Guarantee Calculator" calculates the probability of at least 1 failure per year Q as follows:

$Q=1-R=0.433950.$

Then, the "Guarantee Calculator" estimates the probability of "more than 1 server farm failure per year" E as the probability of two independent server farm failures per year:

$E=Q*Q=0.018831,$ and compares it with a given threshold probability value T1=0.025 (or 2.5%) for the Guarantee Criterion 1. If E is less than T1 (or E is equal to T1), then the GC1 meets marketing requirements and the vendor can offer the guarantee for the scenario #2 configuration. This case for Guarantee Criterion 1 is indicated with "Yes" at the corresponding line of the second column of FIG. 3 and with the remedy payment of $89,250 that is shown at the next line below.

As to scenarios #3 and #4, the corresponding values of the probability E are 0.167077 and 0.997526. Both values are greater than T1=0.025 and this is the reason that the Guarantee Criterion 1 is marked with "No" for scenarios #3 and #4 and the corresponding remedies are not calculated.

In step 53 of FIG. 1, a consolidated output report that includes "Configuration and Guarantee Offers" is presented to the customer for each particular set of the customer's product requirements in the form of the computer screen or a printed report.

In step 54 of FIG. 1, the customer determines "Risk/Cost Configuration and Guarantee Analysis" based on the output report that can include more then one configuration/guarantee offer, and in step 55 "Configuration Selection", the customer selects the Server Farm configuration based on the customer's original complex product requirements and the analysis of the additional guarantee offers.

As previously mentioned, the above-described method and system can be applied to any particular type of complex product. For example, an automobile might be selected with an automatic transmission, rather than a manual transmission. A six-cylinder engine may be selected instead of a four-cylinder engine. Special extra-large tires might be selected rather than the standard size tire. Based on this method, a particular guarantee for a particular configuration of the automobile can be offered to the customer based on a particular set of the customer requirements.

The same type of analysis could be applied to airplanes, to motorboats, to washing machines, to electrical generation equipment, to vacuum cleaners and many other types of appliances which many customers would like to have a guarantee based on their selected requirements.

Thus, while the present illustrations of the method for complex product configuration and guarantee generation has been especially illustratively devoted to the use of Server Farms, it should also be noted that the same method and system can be applied to any other type of complex product which can be built with different and variable configurations for a customer, and for which one or more than one guarantee criterion can be defined and calculated based on a particular set of customer requirements.

While typical examples of this invention have been applied to Server Farms, it should be understood that the described method and technique may be applied to many types of product configurations and the invention is encompassed by the attached claims.

What is claimed is:

1. A method for complex products configuration and guarantee generation that establishes a relationship process between a vendor company that sells complex configurable products and a customer that wants to buy said complex configurable product based on particular customer requirements comprising the steps of:

(a) evaluating the risk and guarantee method design by vendor marketing management;

(b) selecting at least one complex product requirement which can influence complex product configuration;

(c) selecting at least one guarantee method;

(d) designing at least one said complex product configuration based on said complex product requirement or requirements;

(e) calculating guarantee offers or recommendations for said complex product configurations based on said designed guarantee methods.

2. The method of claim 1 wherein said step (a) of risk evaluation and guarantee method design by vendor marketing management includes the steps of:

(a1) selecting guarantee criteria;

(a2) selecting method of guarantee criteria calculations;

(a3) selecting guarantee criteria thresholds;

(a4) selecting guarantee remedy or guarantee remedy calculation algorithm;

(a5) saving guarantee data and method.

3. The method of claim 1 wherein step (b) involves said complex product performance.

4. The method of claim 1 wherein step (b) involves said complex product availability, reliability, or downtime.

5. The method of claim 1 wherein step (b) involves said complex product cost.

6. The method of claim 1 wherein step (b) involves said complex product requirement to use at least one specific component.

7. The method of claim 1 wherein step (b) involves said complex product requirement not to use at least one specific component.

8. The method of claim 1 wherein step (b) involves said complex product requirement to include at least one specific feature.

9. The method of claim 1 wherein step (b) involves said complex product requirement not to include at least one specific feature.

10. The method of claim 1 wherein step (c) involves said guarantee method with at least one guarantee criteria.

11. The method of claim 1 wherein step (c) involves said guarantee method with said complex product performance as a guarantee criterion.

12. The method of claim 1 wherein step (b) involves said guarantee method with said complex product availability, reliability, or downtime as a guarantee criterion.

13. The method of claim 1 wherein step (b) involves said guarantee method with a guarantee criterion that is a minimum number of said complex product failures per a specified period of time.

* * * * *